United States Patent
Chung et al.

(10) Patent No.: US 11,419,158 B1
(45) Date of Patent: Aug. 16, 2022

(54) WIRELESS DATA TRANSMITTING DEVICE, WIRELESS DATA TRANSMITTING SYSTEM, AND WIRELESS DATA TRANSMITTING METHOD

(71) Applicant: Mars Semiconductor Corp., Hsinchu (TW)

(72) Inventors: Ming Liang Chung, Hsinchu (TW); Yi-Shing Chang, Hsinchu (TW)

(73) Assignee: Mars Semiconductor Corp., Hsinchu (TW)

( * ) Notice: Subject to any disclaimer, the term of this patent is extended or adjusted under 35 U.S.C. 154(b) by 0 days.

(21) Appl. No.: 17/170,599

(22) Filed: Feb. 8, 2021

(51) Int. Cl.
*H04W 74/08* (2009.01)

(52) U.S. Cl.
CPC ..... *H04W 74/085* (2013.01); *H04W 74/0858* (2013.01)

(58) Field of Classification Search
CPC .......................... H04W 74/085; H04W 74/0858
See application file for complete search history.

(56) References Cited

U.S. PATENT DOCUMENTS

| | | | | |
|---|---|---|---|---|
| 7,916,650 | B2* | 3/2011 | Kim | H04L 43/0811 370/252 |
| 8,660,108 | B2* | 2/2014 | Pratt, Jr. | H04W 56/002 370/350 |
| 9,532,382 | B2* | 12/2016 | Liu | H04W 74/0816 |
| 9,942,876 | B2* | 4/2018 | Joly | H04W 72/04 |
| 10,084,661 | B2* | 9/2018 | Zhao | H04L 43/0888 |
| 2018/0212836 | A1* | 7/2018 | Zhao | H04L 41/142 |
| 2021/0168861 | A1* | 6/2021 | Lee | H04W 74/0808 |

* cited by examiner

*Primary Examiner* — Ahmed Elallam
(74) *Attorney, Agent, or Firm* — Rosenberg, Klein & Lee (57) ABSTRACT

A wireless data transmitting system having a wireless data receiving device and a plurality of wireless data transmitting devices is disclosed. Each of the wireless data transmitting devices transmits data at every a specific period if no collision is detected during data transmission, and if a collision is detected during data transmission, the wireless data transmitting device decides a back-off delay time and transmits data after the back-off delay time has elapsed. The back-off delay time of the wireless data transmitting device is a multiplication of a unit slot time of the wireless data transmitting device transmitting at least one data packet, by k, wherein k is an integer equal to or larger than 1 and is randomly decided by a probability distribution model of the wireless data transmitting device.

20 Claims, 7 Drawing Sheets

WIRELESS DATA TRANSMITTING DEVICE, WIRELESS DATA TRANSMITTING SYSTEM, AND WIRELESS DATA TRANSMITTING METHOD

TECHNICAL FIELD

The present disclosure relates to a wireless data transmitting device, a wireless data transmitting system, and a wireless data transmitting method, more particularly, to a device, a system, and a method capable of reducing collisions when transmitting wireless data.

BACKGROUND

In a wireless data transmitting system with a number of wireless data transmitting devices, collisions occur when several of the wireless data transmitting devices transmit data at the same time, thereby causing a halt on the transmission of data to be sent to a target device such as a server or a base station. One of the conventional ways in wireless data transmitting technologies to solve this issue is to implement Carrier Sense Multiple Access with Collision Avoidance (CSMA/CA).

The collision avoidance mechanism of CSMA/CA is sensing the network channel when a wireless data transmitting device acting as a transmitting terminal wants to transmit data. If there is no other signal transmission in the network channel, the transmitting terminal waits for a random period of time, and transmits data in a packet if no signal transmission is sensed during this period of time. If at the beginning the transmitting terminal sensed the network channel is being occupied, the transmitting terminal waits until the network channel is idle and waits for an additionally random back-off delay time before re-entering into the network channel in a competing mode.

Although the collision avoidance mechanism of CSMA/CA is used in wireless Ethernet networks, it is not suitable for wireless data transmitting devices that have limited power supply and have to transmit data periodically. For example, most Internet of Thing (IoT) sensors operate on batteries, not supply mains, as their power sources, and so frequent executions of channel competitions would drain battery power very quickly, which lead to an increase in the battery replacement frequency. Moreover, the collision avoidance mechanism of CSMA/CA cannot assure that the IoT sensor is able to transmit sensed data periodically, and thus a server of an IoT system may not monitor or control the environment or equipment of the IoT system based on real-time data.

Take a smart greenhouse as an example, the ambient humidity, the air composition, the temperature, and etc. in the greenhouse need to be sensed periodically so as to control the irrigation equipment, the air supply equipment, the air conditioning equipment, and etc. for effectively growing plants and vegetation. When applying the collision avoidance mechanism of CSMA/CA, data containing information on the ambient humidity, the air composition, and the temperature may not be periodically transmitted to the server used for controlling the irrigation equipment, the air supply equipment, and the air conditioning equipment. As such, the ambient humidity, the air composition, and the temperature in the greenhouse may not be effectively modulated to conditions suitable for plants/vegetation to grow healthily, and the plants/vegetation may end up having deformity or not meeting a specific standard for ornamental or edible purposes.

SUMMARY

An object of the present disclosure is to provide a wireless data transmitting device that is capable of reducing collisions. The wireless data transmitting device solved the technical issue of CSMA/CA being unsuitable for wireless data transmitting devices using batteries as power supply and needing to transmit data periodically. Further, the wireless data transmitting device according to embodiments of the present disclosure is able to transmit data periodically after channel competition with other wireless data transmitting devices, which assures a precise monitor of equipment, objects, or environment associated to the wireless data transmitting device. In addition, the present disclosure also provides a wireless data transmitting method used by the wireless data transmitting device and a wireless data transmitting system using the wireless data transmitting device.

In view of the aforementioned object, the present disclosure provides a wireless data transmitting device for use in a wireless data transmitting system. The wireless data transmitting system has a plurality of wireless data transmitting devices and each of the wireless data transmitting devices has a specific period. The specific period of the wireless data transmitting device is a positive integral multiple of the smallest specific period amongst the plurality of specific periods of the plurality of wireless data transmitting devices. The wireless data transmitting device includes a wireless data transmitting unit configured for the wireless data transmitting device to perform at least one of several executions, wherein the several executions include: when no collision is detected by the wireless data transmitting device during data transmission, the wireless data transmitting device transmits data every specific period; when a collision is detected by the wireless data transmitting device during data transmission, the wireless data transmitting device decides a back-off delay time and transmits data after the back-off delay time has elapsed, and if the data is transmitted without collision, starting from a timeslot of the elapsed back-off delay time, the wireless data transmitting device transmits data periodically at every specific period. The back-off delay time is a multiplication of a unit slot time of the wireless data transmitting device transmitting at least one data packet, by k, wherein k is an integer equal to or larger than 1 and is randomly decided by a probability distribution model. Hence, after several attempts to transmit data, the plurality of wireless data transmitting devices in the wireless data transmitting system are able to deviate from sending data at the same time and are able to transmit data periodically.

Optionally, the probability distribution model is a discrete uniform distribution model, a discrete Gaussian distribution model, or a variable probability distribution model whose distribution varies with an exponential back-off manner.

Optionally, the wireless data transmitting device further includes a sensing unit for sensing data, wherein the sensed data is the data to be transmitted by the wireless data transmitting device.

Optionally, the wireless data transmitting device is an Internet of Thing sensor.

Optionally, the wireless data transmitting device further includes a battery for power supply.

In view of the aforementioned object, the present disclosure provides a wireless data transmitting system having a plurality of the aforementioned wireless data transmitting devices and a wireless data receiving device. The present disclosure also provides a wireless data transmitting method that performs the executions of the aforementioned wireless data transmitting device.

In short, the wireless data transmitting device, the wireless data transmitting system, and the wireless data transmitting method disclosed by the present disclosure reduce the occurrence of collisions and allow the wireless data transmitting device to transmit data periodically once collisions have been avoided.

BRIEF DESCRIPTION OF THE DRAWINGS

The structure as well as preferred modes of use, further objects, and advantages of this present disclosure will be best understood by referring to the following detailed description of some illustrative embodiments in conjunction with the accompanying drawings, in which.

DETAILED DESCRIPTION OF THE PREFERRED EMBODIMENTS

The present disclosure provides a wireless data transmitting device capable of reducing collisions, a wireless data transmitting method used by the wireless data transmitting device, and a wireless data transmitting system using the wireless data transmitting device, wherein the wireless data transmitting device is configured to transmit data periodically. When collisions occurred during data transmission, the wireless data transmitting device waits for a random back-off delay time and afterwards tries to transmit the data again. If the later-transmitted data is transmitted successfully and successfully, in other words, data is transmitted without collision, the wireless data transmitting device records the current timeslot, and then transmits data every specific period starting from this current timeslot.

The wireless data transmitting device in the embodiments of the present disclosure is illustrated to be using battery as a power source or a power supply, but the present disclosure does not limit the type of power supply used by the wireless data transmitting device. In one embodiment of the present disclosure, the specific period of each wireless data transmitting device is the same, or is a positive integral multiple (multiplication by an integer equal to or larger than 1, or a non-zero natural number) of the smallest specific period amongst the plurality of specific periods of the plurality of wireless data transmitting devices, which translates into $Pi=Ki*\min\{P1, P2, \ldots, PN\}$, wherein Pi is the specific period of the $i^{th}$ wireless data transmitting device, i is the index value of the wireless data transmitting device and is an integer from 1 to N, $\min\{P1, P2, \ldots, PN\}$ is the smallest value among the specific periods P1~PN, Ki is an integer equal to or larger than 1. According to one embodiment of the present disclosure, the wireless data transmitting device can selectively re-transmit the old data that was not successfully transmitted or the new data that is obtained at current time, but the present disclosure is not limited thereby. In other embodiments of the present disclosure, the probability distribution model of the wireless data transmitting device is the same as each other, different from each other, or the same as some wireless data transmitting devices and different from some other wireless data transmitting devices, and the present disclosure does not limit the probability distribution model that decides the back-off delay time.

After roughly introducing the concept of the wireless data transmitting device, the wireless data transmitting system, and the wireless data transmitting method according to embodiments of the present disclosure, the details of the device, the system, and the method are described herein. First, referring to FIG. 1, which is a schematic diagram illustrating the system structure of a wireless data transmitting system according to an embodiment of the present disclosure. The wireless data transmitting system 100 includes a wireless data receiving device 110 and a plurality of wireless data transmitting device 121~124, wherein the wireless data receiving device 110 is communicatively connected to the wireless data transmitting devices 121~124.

Figure 1:
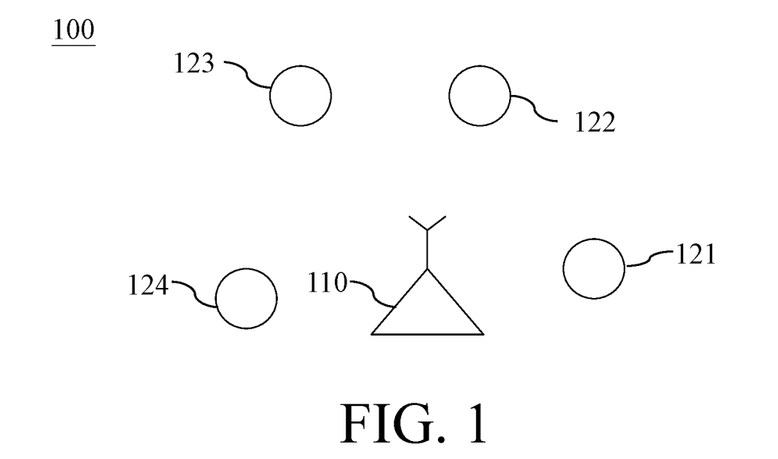
FIG. 1 is a schematic diagram illustrating a system structure of a wireless data transmitting system according to an embodiment of the present disclosure.

The wireless data receiving device 110 is used for receiving data transmitted by the wireless data transmitting devices 121~124. The wireless data receiving device 110 can be a relay device for sending received data to a server, such that the server controls equipment or environment corresponding to the data based on the received data. Or, the wireless data receiving device 110 can be the aforementioned server. The present disclosure is not limited by how the wireless data receiving device 110 is implemented to realize its functions.

Each of the wireless data transmitting devices 121~124 is configured to transmit data periodically once the data is successfully transmitted, and when collisions occurred during data transmission, to transmit data again after the back-off delay time and until data is successfully transmitted. Each of the wireless data transmitting devices 121~124 can be an IoT sensor that uses battery as its power supply, and can even be an IoT sensor that is capable of preprocessing signals in advance, like an artificial intelligence internet of thing sensor (AIoT sensor). The present disclosure is not limited by the type or the number of wireless data transmitting devices 121~124.

In specific, the wireless data transmitting devices 121~124 can have the same specific period, or the specific period of each wireless data transmitting device 121~124 can be a positive integral multiple of the smallest specific period amongst the plurality of specific periods of the plurality of wireless data transmitting devices 121~124, wherein the positive integral multiple refers to a multiplication of the smallest specific period by an integer and the integer is a non-zero natural number that is equal to or larger than 1. In other words, the specific period Pi of the $i^{th}$ wireless data transmitting device 121~124 has the relation of Pi=Ki*min{P1, P2, P3, P4}, wherein i is the index value of the wireless data transmitting device and is an integer from 1 to 4, min{P1, P2, P3, P4} is the smallest specific period among the specific periods P1~P4, and Ki is an integer equal to or larger than 1 or is a non-zero natural number. Simply put, each of the plurality of specific periods P1~P4 is a positive integral multiple of the smallest specific period min{P1, P2, P3, P4} among the plurality of specific periods P1~P4.

The probability distribution model of the wireless data transmitting device 121~124 that decides the back-off delay time is a discrete uniform distribution model, and the delay time is $k\Delta$, wherein k is an integer from 1 to N at a probability of 1/N, $\Delta$ is a unit slot time which the wireless data transmitting device 121~124 takes to transmit at least one data packet. For instance, the unit time to transmit a data packet is Amin, and the unit slot time $\Delta$ is equal to or larger than Amin. N can be any of P1/$\Delta$, P2/$\Delta$, P3/$\Delta$, or P4/$\Delta$, and preferably is min{P1, P2, P3, P4}/$\Delta$, but the value of N is not limited thereby. In addition, the wireless data transmitting devices 121~124 either have the same probability distribution models, different probability distribution models, or some are the same and some are different. The present disclosure is not limited by the probability distribution models that decide the back-off delay time.

Only during the competing mode that collisions may occur, and so when each of the wireless data transmitting devices 121~124 no longer encounter collisions, each of them transmits data at every specific period, such that it prevents the wireless data transmitting devices 121~124 from sending data at the same time. Thus, the number of collisions reduces dramatically as a whole, and so for the wireless data transmitting devices 121~124 that use batteries as power sources, the frequency of battery replacement is decreased. Furthermore, the goal of the wireless data transmitting devices 121~124 transmitting data periodically to the wireless data receiving device 110 is achieved and the concern of the server unable to monitor or control corresponding environment or equipment in real-time due to lack of periodically-transmitted data is prevented.

Figure 2:
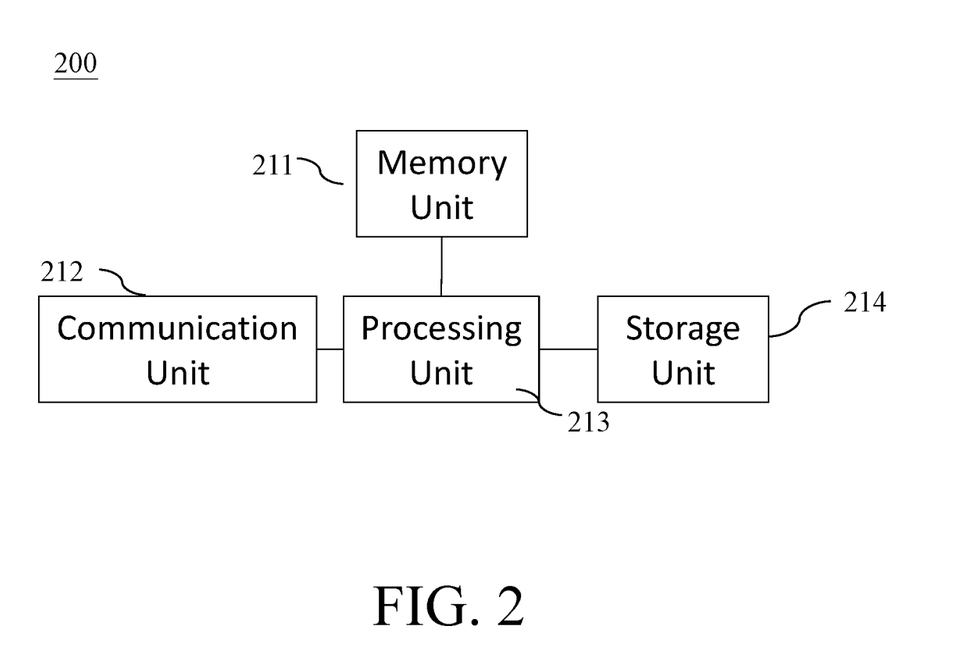
FIG. 2 is a functional block diagram of a wireless data receiving device according to an embodiment of the present disclosure.

Referring to FIG. 2, a functional block diagram of a wireless data receiving device according to an embodiment of the present disclosure is illustrated. The wireless data receiving device 110 of FIG. 1 can be realized by the wireless data receiving device 200 in FIG. 2. The wireless data receiving device 200 includes a memory unit 211, a communication unit 212, a processing unit 213, and a storage unit 214, wherein the processing unit 213 is electrically connected to the memory unit 211, the communication unit 212, and the storage unit 214.

In the embodiment shown in FIG. 2, a program code is stored in the storage unit 214 and is accessible by the processing unit 213. The memory unit 212 is a general Random Access Memory (RAM) that allows the processing unit 213 to temporarily store data therein. The communication unit 211 is used for wireless communication so as to receive data transmitted by the wireless data transmitting devices 121~124 of FIG. 1 and is controlled by the processing unit 213 according to the program code executed such that the communication unit 211 has the functions of and acts as the wireless data receiving device 110 of FIG. 1.

It is to be noted that FIG. 2 merely disclosed one way to implement the wireless data receiving device 200, whereas hardware circuits are used as a way of implementation in other embodiments, and thus the present disclosure is not limited by the ways of implementing the wireless data receiving device 200. In another embodiment, the wireless data receiving device 200 includes a plurality of hardware circuits configured to form a wireless data receiving unit that realizes the functions of the wireless data receiving device 110, but the way of implementing the wireless data receiving unit is not limited by the plurality of hardware circuits, it can also be through software modules in combination with at least one hardware circuit.

Figure 3:
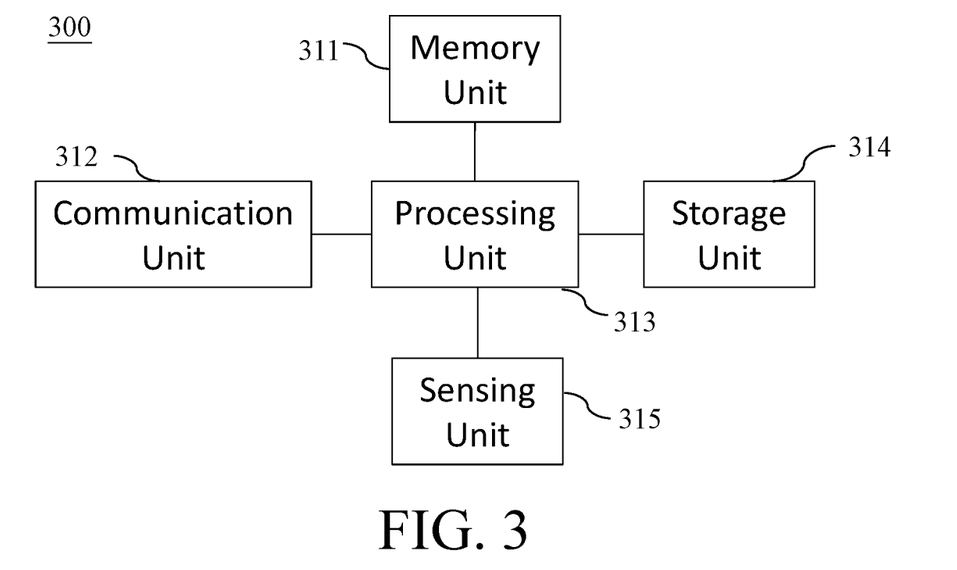
FIG. 3 is a functional block diagram of a wireless data transmitting device according to an embodiment of the present disclosure.

Referring to FIG. 3, a functional block diagram of a wireless data transmitting device according to an embodiment of the present disclosure is illustrated. The wireless data transmitting device 121~124 of FIG. 1 can be realized by the wireless data transmitting device 300 in FIG. 3. The wireless data receiving device 300 includes a memory unit 311, a communication unit 312, a processing unit 313, a storage unit 314, and a sensing unit 315, wherein the processing unit 313 is electrically connected to the memory unit 311, the communication unit 312, the storage unit 314, and the sensing unit 315.

In the embodiment show in FIG. 3, a program code is stored in the storage unit 314 and is accessible by the processing unit 313. The memory unit 312 is a general RAM that allows the processing unit 313 to temporarily store data therein. The sensing unit 315 is used for sensing data relative to environment or equipment and sending the sensed data to the communication unit 313. The communication unit 311 is used for wireless communication so as to transmit data periodically and is controlled by the processing unit 213 according to the program code executed such that the communication unit 311 has the functions of the wireless data transmitting device 121~124 of FIG. 1.

It is to be noted that FIG. 3 merely disclosed one way to implement the wireless data transmitting device 300, whereas hardware circuits are used as a way of implementation in other embodiments, and thus the present disclosure is not limited by the ways of implementing the wireless data transmitting device 300. In another embodiment, the wireless data transmitting device 300 includes a plurality of hardware circuits configured to form a wireless data transmitting unit that realizes the functions of the wireless data transmitting devices 121~124, but the way of implementing the wireless data transmitting unit is not limited by the plurality of hardware circuits, it can also be through software modules in combination with at least one hardware circuit.

Figure 4:
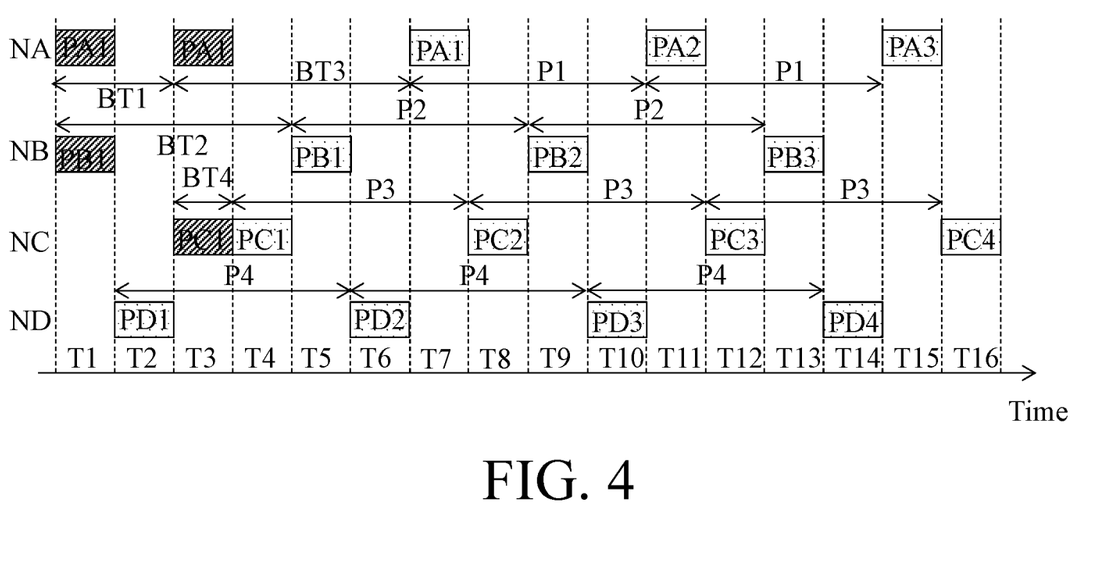
FIG. 4 is a schematic diagram illustrating a data transmission schedule of a wireless data transmitting device according to an embodiment of the present disclosure.

FIG. 4 is a data transmission schedule of a wireless data transmitting device according to an embodiment of the present disclosure. Referring to FIG. 4, the wireless data transmitting devices NA~ND transmit data sensed by their sensing units respectively at every specific periods P1~P4, after the wireless data transmitting devices NA~ND have successfully transmitted data without collision and subsequently has escaped from a competing mode. In this embodiment, the time length of slots T1~T16 is the unit slot time $\Delta$ which the wireless data transmitting device NA~ND takes to transmit at least one data packet, the specific periods P1~P4 are all 4Δ, and the probability of each wireless data transmitting device NA~ND being delayed for Δ, 2Δ, 3Δ, and 4Δ is ¼.

At slot T1, the wireless data transmitting device NA and the wireless data transmitting device NB respectively transmit data PA1 and data PB1 and so there is a collision. The wireless data transmitting device NA and the wireless data transmitting device NB then respectively decide a back-off delay time BT1 and a back-off delay time BT2 and respectively transmit data PA1 and data PB1 after the back-off delay time BT1 and the back-off delay time BT2 have respectively elapsed, wherein the back-off delay time BT1 is decided to be 2Δ and the back-off delay time BT2 is 4Δ. At slot T2, only the wireless data transmitting device ND transmits data PD1 and so there is no collision. Therefore, the wireless data transmitting device ND subsequently transmits data PD2~PD4 at every specific period P4, where the data PD2~PD4 are to be respectively transmitted at slots T6, T10, and T14. More specifically, at slot T2, the wireless data transmitting device ND did not detect any collision and was able to successfully transmit data PD1, and so the wireless data transmitting device ND records the slot T2, and after slot T2, transmits data PD2~PD4 sequentially at every specific period P4, which means data PD2~PD4 are respectively transmitted at slots T6, T10, and T14 (T6=T2+P4, T10=T2+2*P4, T14=T2+3*P4).

At slot T3, the wireless data transmitting device NA and the wireless data transmitting device NC respectively transmit data PA1 and data PC1 and so there is a collision. The wireless data transmitting device NA and the wireless data transmitting device NC then respectively decide a back-off delay time BT3 and a back-off delay time BT4 and respectively transmit data PA1 and data PC1 after the back-off delay time BT3 and the back-off delay time BT4 have respectively elapsed, wherein the back-off delay time BT3 is decided to be 4Δ and the back-off delay time BT4 is 4Δ. At slot T4, only the wireless data transmitting device NC transmits data PC1 and so there is no collision. Therefore, the wireless data transmitting device NC subsequently transmits data PC2~PC4 every specific period P3, where the data PC2~PC4 are to be respectively transmitted at slots T8, T12, and T16. More particularly, at slot T4, the wireless data transmitting device NC did not detect any collision and was able to successfully transmit data PC1, and so the wireless data transmitting device NC records the slot T4, and after slot T4, transmits data PC2~PC4 sequentially every specific period P3, which means data PC2~PC4 are respectively transmitted at slots T8, T12, and T16 (T8=T4+P3, T12=T4+2*P3, T16=T4+3*P3).

At slot T5, only the wireless data transmitting device NB transmits data PB1 and so there is no collision. Therefore, the wireless data transmitting device NB subsequently transmits data PB2 and data PB3 every specific period P2, where the data PB2 and PB3 are to be respectively transmitted at slots T9 and T13. More specifically, at slot T5, the wireless data transmitting device NB did not detect any collision and was able to successfully transmit data PB1, and so the wireless data transmitting device NB records the slot T5, and after slot T5, transmits data PB2 and PD3 sequentially every specific period P2, which means data PB2 and PB3 are respectively transmitted at slots T9 and T13 (T9=T5+P2, T13=T5+2*P2).

At slot T7, only the wireless data transmitting device NA transmits data PA1 and so there is no collision. Therefore, the wireless data transmitting device NA subsequently transmits data PA2 and data PA3 every specific period P1, where the data PA2 and PA3 are to be transmitted respectively at slots T11 and T15. More specifically, at slot T7, the wireless data transmitting device NA did not detect any collision and was able to successfully transmit data PA1, and so the wireless data transmitting device NA records the slot T7, and after slot T7, transmits data PA2 and PA3 sequentially every specific period P2, which means data PA2 and PA3 are respectively transmitted at slots T11 and T15 (T11=T7+P1, T15=T7+2*P1).

In short, for the wireless data transmitting device, if there is no collision, data is transmitted periodically at every specific period starting from the current slot at which data is transmitted; if there is a collision, data is transmitted after the back-off delay time has elapsed, and if the data is transmitted successfully, data is transmitted periodically at every specific period starting from the slot to which the back-off delay time has elapsed. Hence, after several attempts to transmit data, the plurality of wireless data transmitting devices in the wireless data transmitting system are able to avoid transmitting data at the same time and to transmit data periodically at their specific periods.

Figure 5:
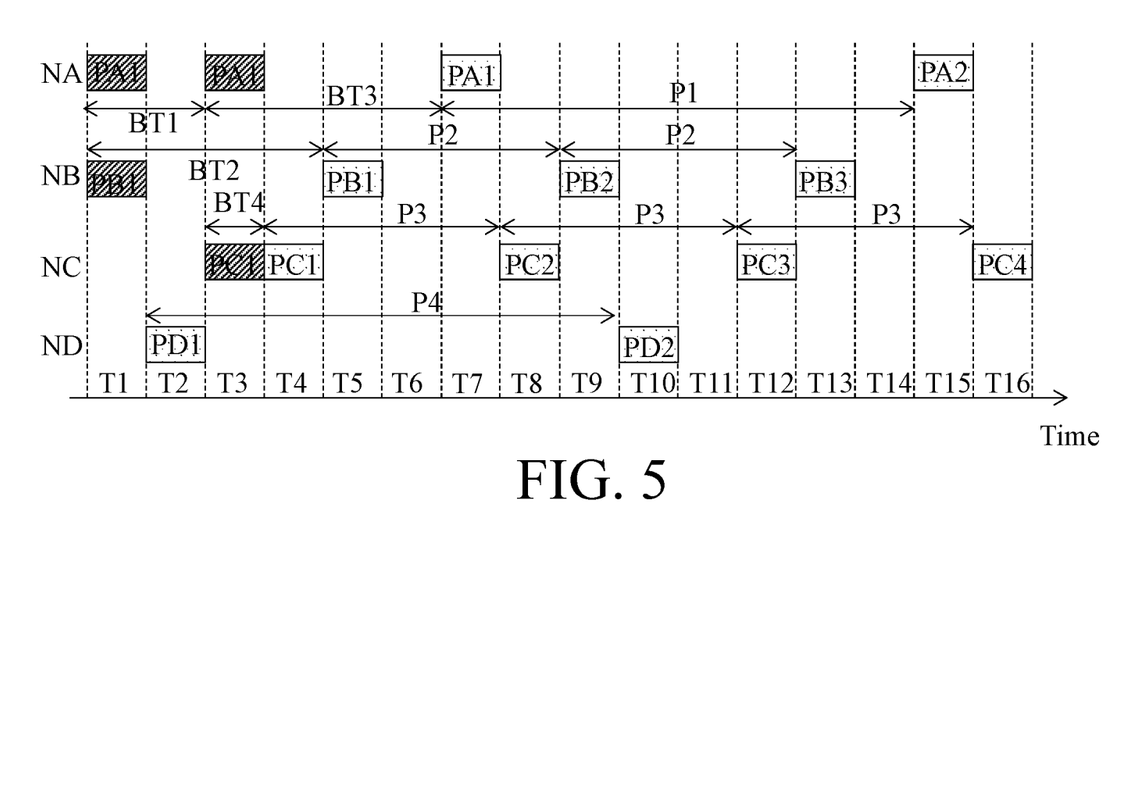
FIG. 5 is a schematic diagram illustrating a data transmission schedule of a wireless data transmitting device according to another embodiment of the present disclosure.

In the embodiment shown in FIG. 4, the specific periods P1~P4 are all 4Δ, but as aforementioned, the present disclosure is not limited thereby. FIG. 5 is a data transmission schedule of a wireless data transmitting device according to another embodiment of the present disclosure, wherein the specific periods P1 and P4 are 8Δ, the specific periods P2 and P3 are 4Δ. Referring to FIG. 5, as each of the wireless data transmitting devices NA~ND was able to successfully transmit data, the wireless data transmitting devices NA~ND begin to transmit data periodically, and the possibility of transmitting data at the same time is avoided to prevent collision.

In the embodiment shown in FIG. 5, the probability of each of the wireless data transmitting devices NA~ND delaying for a time of Δ, 2Δ, 3Δ, and 4Δ is all ¼, which means the probability distribution models, which decide the back-off delay times, of the wireless data transmitting devices NA~ND are all a discrete uniform distribution model of {Δ, 2Δ, 3Δ, 4Δ}. However, as aforementioned, the probability distribution model which decides the back-off delay time is not limited thereby. In other embodiments, the probability distribution models deciding the back-off delay times of the wireless data transmitting devices NA and ND are a discrete uniform distribution model of {Δ, 2Δ, 3◇, 4Δ, 5Δ, 6Δ, 7Δ, 8Δ}, and the probability distribution models deciding the back-off delay times of the wireless data transmitting devices NB and NC are a discrete uniform distribution model of {Δ, 2Δ, 3Δ, 4Δ}.

In consideration of a situation where collisions can be reduced at competing mode and each wireless data transmitting device NA~ND can successfully transmit data periodically, the probability distribution model deciding the back-off delay time of the wireless data transmitting device NA~ND can be a variable probability distribution model, like a probability distribution model whose distribution varies with an exponential back-off manner. For example, at first collision, each wireless data transmitting device NA~ND decides the back-off delay time of Δ or 2Δ at a probability of ½; at second collision, decides the back-off delay time of Δ, 2Δ, 3Δ, or 4Δ at a probability of ¼; and at third collision, decides the back-off delay time of Δ~8Δ at a probability of ⅛. Since the biggest specific period of the wireless data transmitting devices NA~ND is 8Δ, the biggest specific period of 8Δ can therefore be used as the largest possible back-off delay time to obtain a preferred effect. It is to be noted that that present disclosure is not limited by the methods or types of the probability distribution model for the back-off delay time.

In the embodiments of FIG. 4 and FIG. 5, when there is a collision, the wireless data transmitting devices NA~ND wait for the decided back-off delay time and then retransmit data that was not successfully sent out, but because IoT systems sometimes require real-time data and do not care about the previous data that was not sent out successfully, the aforementioned embodiments can be adjusted such that when a collision has occurred, the wireless data transmitting devices NA~ND, after waiting for the decided back-off delay time, transmit data that is currently sensed.

Figure 6:
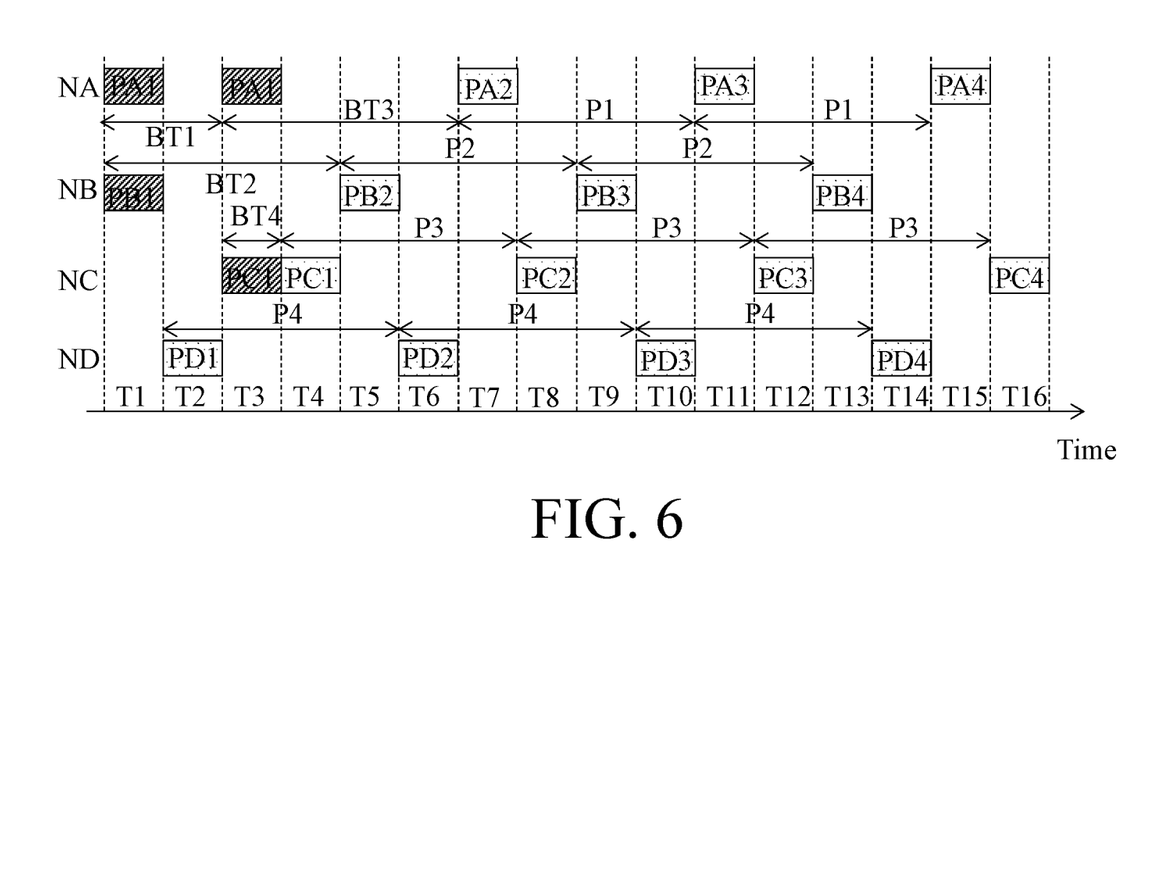
FIG. 6 is a schematic diagram illustrating a data transmission schedule of a wireless data transmitting device according to yet another embodiment of the present disclosure.

FIG. 6 is a data transmission schedule of a wireless data transmitting device according to yet another embodiment of the present disclosure. The embodiment of FIG. 6 is substantially the same as that of FIG. 4, but the wireless data transmitting devices NA~ND wait for the decided back-off delay time and then transmit currently-sensed data. Suppose that the wireless data transmitting devices NA~ND sense for new data every $4\Delta$ and start a first sensing at slot T1, the wireless data transmitting device NA transmits data PA2~PA4 respectively at slots T7, T11, and T15, and the wireless data transmitting device NB transmits data PB2~PB4 respectively at slots T5, T9, and T13.

Figure 7:
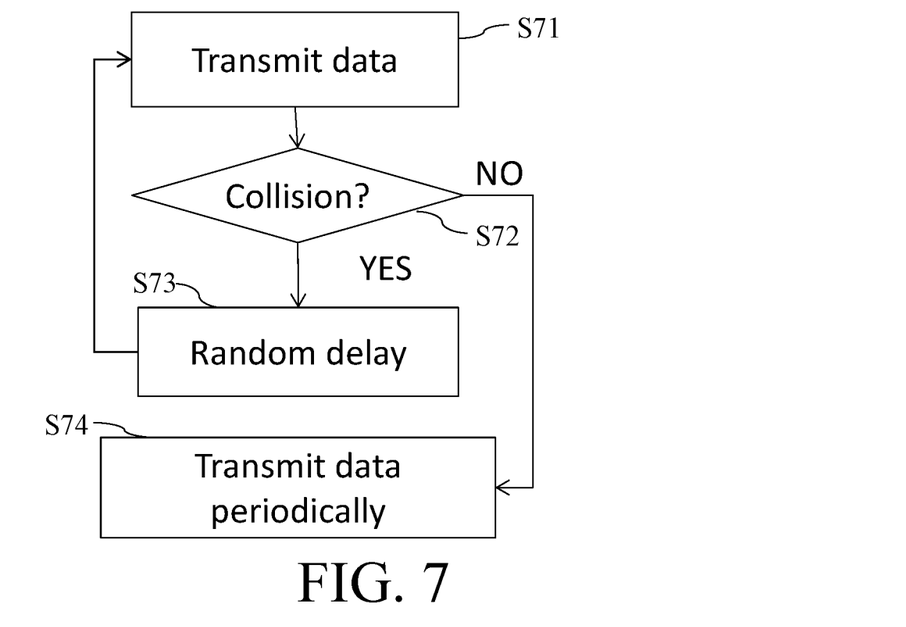
FIG. 7 is a flow chart of a wireless data transmitting method according to an embodiment of the present disclosure.

Referring to FIG. 7, which is a flow chart of a wireless data transmitting method according to an embodiment of the present disclosure, first in step S71, the wireless data transmitting device transmits data. In step S72, the wireless data transmitting device executes a detection to determine whether data is sent out successfully or data has encountered a collision. If there is a collision, the wireless data transmitting device decides a back-off delay time and waits for the back-off delay time in step S73, and after the back-off delay time has elapsed, the wireless data transmitting device tries to transmit data again by returning to and executing step S71. The back-off delay time is random as it is randomly decided by the probability distribution model. If there is no collision, the wireless data transmitting device then transmits data periodically in step S74. In this embodiment, the wireless data transmitting device begins transmitting data periodically when there is no collision during the first data transmission, and even if there is collision during the periodic data transmission, the wireless data transmitting device will not need to decide a back-off delay time as the other one or at least one wireless data transmitting device involved in the collision will decide a back-off delay time and transmit data again after the back-off delay time has elapsed.

Figure 8:
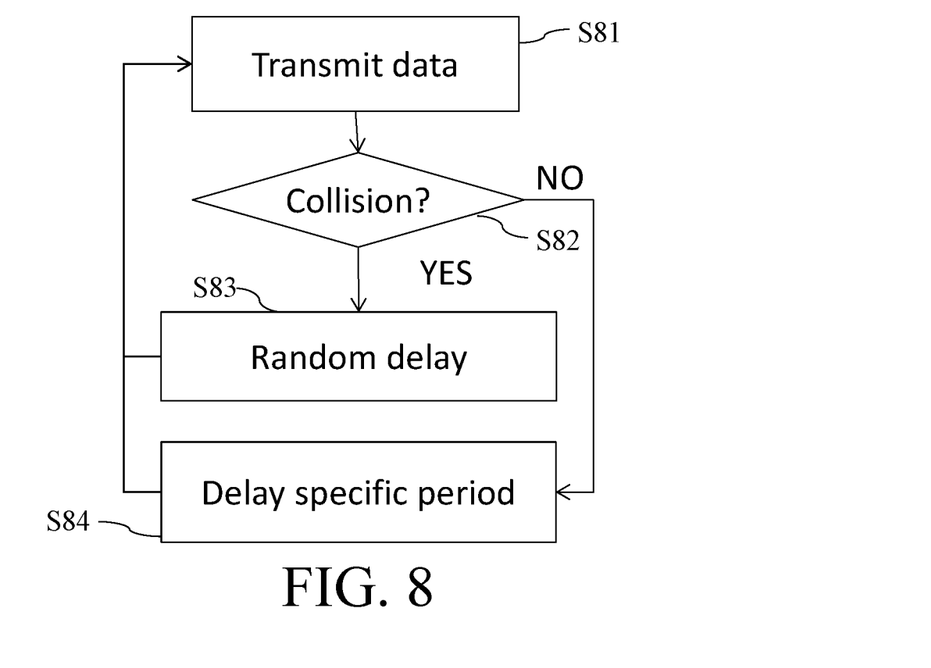
FIG. 8 is a flow chart of a wireless data transmitting method according to another embodiment of the present disclosure.

It is to be noted that the present disclosure is not limited by the aforementioned embodiment. Another method is for the wireless data transmitting device to decide a back-off delay time when there is a collision and to transmit data again after the back-off delay time has elapsed. FIG. 8 is a flow chart of a wireless data transmitting method according to another embodiment of the present disclosure. Referring to FIG. 8, steps S81~S83 are similar to steps S71~S73 of FIG. 7, and therefore is not described herein. Step S84 is not for the wireless data transmitting device to transmit data periodically, but to wait for a specific period, and then return to step S81 to transmit data. The embodiment of FIG. 8 also allows the wireless data transmitting device to transmit data periodically when there is no more occurrence of collisions, and if collision occurs again, all of the wireless data transmitting devices involved in this collision will decide their back-off delay times and transmit data respectively after their back-off delay times have elapsed.

Figure 9:
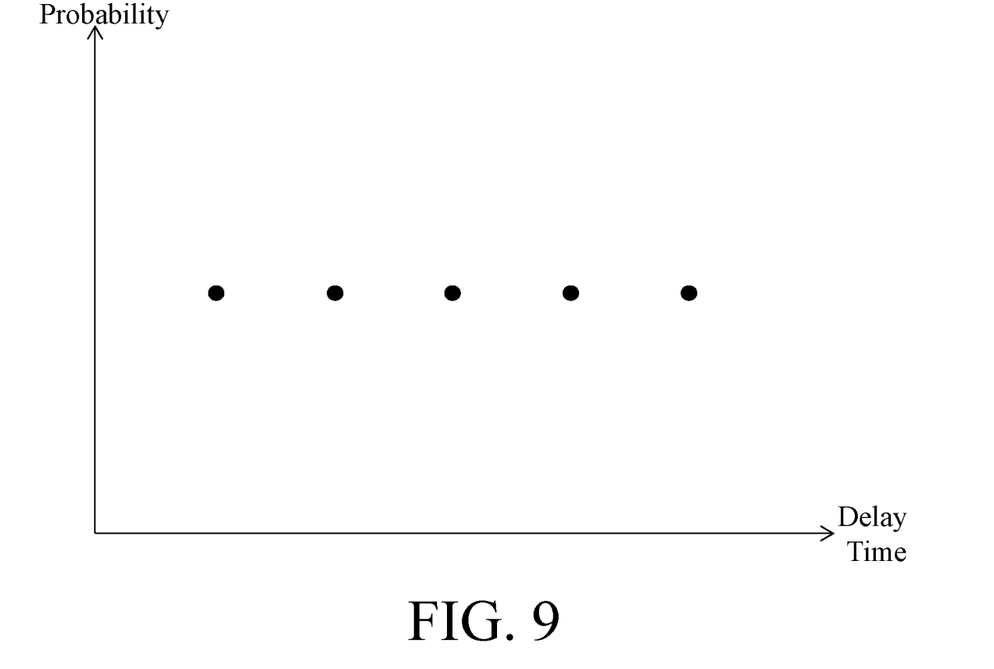
FIG. 9 is a schematic diagram illustrating a probability distribution model for a back-off delay time of a wireless data transmitting device according to an embodiment of the present disclosure.
Figure 10:
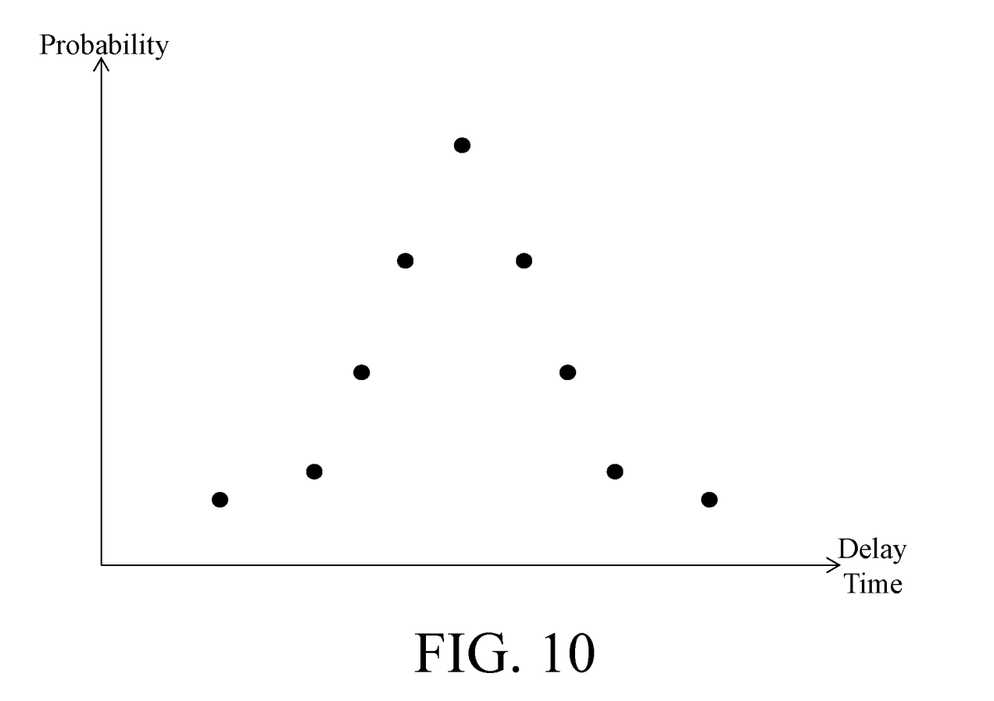
FIG. 10 is a schematic diagram illustrating a probability distribution model for a back-off delay time of a wireless data transmitting device according to another embodiment of the present disclosure.

Next, referring to FIG. 9 and FIG. 10, which are schematic diagrams respectively illustrating a probability distribution model for a back-off delay time of a wireless data transmitting device according to two embodiments of the present disclosure, the probability distribution model shown in FIG. 9 is a discrete uniform distribution model, and the probability distribution model shown in FIG. 10 is a discrete Gaussian distribution model. The present disclosure does not limit and is not limited by the types of the probability distribution model for the back-off delay time of the wireless data transmitting device.

Based on the aforementioned concept and spirit of the present disclosure, an application of the present disclosure in practice is described herein. A wireless data transmitting system has 100 wireless data transmitting devices and a wireless data receiving device, wherein the period at which data is to be transmitted by each wireless data transmitting device is the same, like P. The time period of the period P is divided into more than 100 slots, such as 500 slots t1~t500, wherein the time length of the slots must not be less than a time length for transmitting the data required to be periodically transmitted, in other words, the amount of slots divided cannot be so large to an extent where the time length of the slot is too small to successfully transmit a data that is required to be transmitted periodically. At first, each wireless data transmitting device transmits data at a random slot and thus collisions may occur when some of the wireless data transmitting devices are transmitting data and so data cannot be sent out successfully to the wireless data receiving device. The wireless data transmitting devices involved in the collisions randomly decide their back-off delay times, for example, deciding a back-off delay time between $\{\Delta, 2\Delta, \ldots, 100\Delta\}$, wherein $\Delta=P/500$, and $\Delta \geq \Delta min$. Last, when every wireless data transmitting device is able to transmit data successfully, each wireless data transmitting device records the time of the current slot at which the data is transmitted, like $t_i$, and then transmits data periodically at slots $t_i+P$, $t_i+2P, \ldots, t_i+MP$, where M is a positive integer and i is an integer between 1 to 500.

Since the wireless data transmitting devices in the wireless data transmitting system of the present disclosure are able to avoid transmitting data at the same time after several attempts to transmit data and are able to transmit data periodically according to their specific periods, the wireless data transmitting device of the present disclosure is suitable for use in IoT applications where data need to be periodically obtained for monitoring purpose. For example, in a smart greenhouse, the ambient humidity, the air composition, and the temperature need to be sensed regularly so that the irrigation equipment, the air supply equipment, and the air conditioning equipment can be controlled to optimize conditions for plants and vegetation to grow effectively. If the collision avoidance mechanism of CSMA/CA is applied, data relating to the ambient humidity, the air composition, and the temperature may not be periodically transmitted to a server that controls the irrigation equipment, the air supply equipment, and the air conditioning equipment. On the contrary, the wireless data transmitting system of the present disclosure is capable of transmitting data periodically by a plurality of wireless data transmitting devices at their specific periods and avoiding transmitting data at the same time, after the wireless data transmitting devices tried several times to transmit data. Hence, the ambient humidity, the air composition, and the temperature can be effectively adjusted to conditions optimal for the growth of plants or vegetation, and so there is no deformity during the growth of plants or vegetation and the grown plants or vegetation can meet the specific standard for ornamental or edible purposes. It is to be noted that the present disclosure is not limited by the aforementioned application; the wireless data transmitting system of the present disclosure is also suitable for other applications like smart factories, smart environment air conditioners, smart aqualculture/agriculture farming, smart health care, etc.

In view of above, comparing to the convention technology, the present disclosure provides a wireless data transmitting system that reduces collisions during data transmission, enhances transmitting efficiency, and lowers the power consumption of wireless data transmitting devices. Moreover, the wireless data transmitting system of the present disclosure allows the wireless data transmitting device to transmit data periodically once there is no collision during data transmission so as to fulfil the goal of real-time monitoring or controlling environment or corresponding equipment. In addition, the complexity of hardware and software derived from implementing the present disclosure is low and is easy to realize. Thus, based on the aforementioned advantages and applicable situations, the wireless data transmitting system of the present disclosure has a high economic value in IoT industry or other markets, and so the present disclosure has industrial applicability and enormous market and economic benefit.

The above disclosure is only the preferred embodiment of the present disclosure, and not used for limiting the scope of the present disclosure. All equivalent variations and modifications on the basis of shapes, structures, features and spirits described in claims of the present disclosure should be included in the claims of the present disclosure.

The invention claimed is:

1. A wireless data transmitting device for use in a wireless data transmitting system, the wireless data transmitting device comprising:
    a wireless data transmitting unit configured for the wireless data transmitting unit to perform at least one of several executions, wherein the several executions comprise:
        when no collision is detected by the wireless data transmitting device during data transmission, the wireless data transmitting device transmits data every specific period; and
        when a collision is detected by the wireless data transmitting device during data transmission, the wireless data transmitting device decides a back-off delay time and transmits data after the back-off delay time has elapsed, and if the data is transmitted without collision, starting from a timeslot of the elapsed back-off delay time, the wireless data transmitting device transmits data every specific period;
    wherein the back-off delay time is a unit slot time which the wireless data transmitting device takes to transmit at least one data packet multiplied by k, and k is a randomly-decided integer equal to or larger than 1.

2. The wireless data transmitting device of claim 1, wherein the back-off delay time is decided by a probability distribution model of the wireless data transmitting device.

3. The wireless data transmitting device of claim 2, wherein the probability distribution model is a discrete uniform distribution model, a discrete Gaussian distribution model, or a variable probability distribution model whose distribution varies with an exponential back-off manner.

4. The wireless data transmitting device of claim 1, further comprising a sensing unit for sensing data to be transmitted by the wireless data transmitting device.

5. The wireless data transmitting device of claim 1, wherein the wireless data transmitting device is an Internet of Thing Sensor.

6. The wireless data transmitting device of claim 1, further comprising a battery for power supply.

7. The wireless data transmitting device of claim 1, wherein the wireless data transmitting system comprises a plurality of wireless data transmitting devices, and the specific period of each wireless data transmitting device is a positive integral multiple of the smallest specific period amongst the plurality of specific periods of the plurality of wireless data transmitting devices.

8. A wireless data transmitting system comprising:
    a wireless data receiving device; and
    a plurality of wireless data transmitting devices for transmitting data to the wireless data receiving device;
    wherein each of the wireless data transmitting devices detects for collisions during data transmission,
    when no collision is detected, the wireless data transmitting device transmits data every specific period; and
    when a collision is detected, the wireless data transmitting device decides a back-off delay time and transmits data after the back-off delay time has elapsed, and if the data is transmitted without collision, the wireless data transmitting device transmits data every specific period starting from a timeslot of the elapsed back-off delay time; wherein the back-off delay time is a unit slot time which the wireless data transmitting device takes to transmit at least one data packet multiplied by k, and k is a randomly-decided integer equal to or larger than 1.

9. The wireless data transmitting system of claim 8, wherein k is decided by a probability distribution model of the wireless data transmitting device.

10. The wireless data transmitting system of claim 9, wherein the plurality of probability distribution models of the plurality of wireless data transmitting devices are the same as each other, different from each other, or the same as some ones and different from some other ones.

11. The wireless data transmitting system of claim 10, wherein the probability distribution model is a discrete uniform distribution model, a discrete Gaussian distribution model, or a probability distribution model whose distribution varies with an exponential back-off manner.

12. The wireless data transmitting system of claim 8, further comprising a sensing unit for sensing data to be transmitted by the wireless data transmitting device.

13. The wireless data transmitting system of claim 8, further comprising a battery for power supply.

14. The wireless data transmitting system of claim 8, wherein the specific period of each wireless data transmitting device is a positive integral multiple of the smallest specific period amongst the plurality of specific periods of the plurality of wireless data transmitting devices.

15. The wireless data transmitting device of claim 8, wherein the wireless data transmitting device is an Internet of Thing Sensor.

16. A wireless data transmitting method, being executed in each of a plurality of wireless data transmitting devices of a wireless data transmitting system, the wireless data transmitting device having a specific period that is a positive integral multiple of the smallest specific period amongst the plurality of specific periods of the plurality of wireless data transmitting devices, the method comprising:
    the wireless data transmitting device transmitting data;

when the wireless data transmitting device detects no collision during data transmission, the wireless data transmitting device transmitting data every specific period; and when the wireless data transmitting device detects a collision during data transmission, the wireless data transmitting device deciding a back-off delay time and transmitting data after the back-off delay time has elapsed, and if the data is transmitted without collision, the wireless data transmitting device transmitting data every specific period starting from a timeslot of the elapsed back-off delay time;

wherein the back-off delay time is a unit slot time which the wireless data transmitting device takes to transmit at least one data packet multiplied by k, and k is an integer equal to or larger than 1 and is randomly decided by a probability distribution model.

17. The wireless data transmitting method of claim 16, wherein the probability distribution model is a discrete uniform distribution model, a discrete Gaussian distribution model, or a probability distribution model whose distribution varies with an exponential back-off manner.

18. The wireless data transmitting method of claim 16, wherein the wireless data transmitting device is an Internet of Thing Sensor.

19. The wireless data transmitting method of claim 16, wherein the wireless data transmitting device comprises a battery for power supply.

20. The wireless data transmitting method of claim 16, wherein the wireless data transmitting device comprises a sensing device for sensing data to be transmitted by the wireless data transmitting device.

\* \* \* \* \*